United States Patent
Seo et al.

(10) Patent No.: US 7,336,432 B2
(45) Date of Patent: Feb. 26, 2008

(54) OPTICAL PICKUP AND OPTICAL DISC DEVICE

(75) Inventors: Katsuhiro Seo, Kanagawa (JP); Yoshiaki Kato, Gunma (JP); Yoshiki Okamoto, Kanagawa (JP); Takeshi Yonezawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 110 days.

(21) Appl. No.: 11/214,748

(22) Filed: Aug. 31, 2005

(65) Prior Publication Data

US 2006/0050413 A1    Mar. 9, 2006

(30) Foreign Application Priority Data

Sep. 3, 2004    (JP) .............................. 2004-256821

(51) Int. Cl.
*G02B 9/06* (2006.01)

(52) U.S. Cl. ................... 359/794; 359/719; 369/112.2

(58) Field of Classification Search ................ 359/754, 359/763, 771, 776, 784, 686, 689, 719; 369/112.2, 369/112.19, 112.24
See application file for complete search history.

(56) References Cited

U.S. PATENT DOCUMENTS 5,818,643 A    10/1998    Fujioka

2004/0085885 A1*  5/2004  Kikuchi et al. ........ 369/112.24
2004/0109401 A1*  6/2004  Ogasawara ............ 369/112.19
2004/0264343 A1   12/2004 Hendriks et al.
2005/0122597 A1   6/2005  Tanaka et al.
2006/0114793 A1*  6/2006  Tonami .................. 369/112.01

FOREIGN PATENT DOCUMENTS

| EP | 1 043 615 A1 | 10/2000 |
|---|---|---|
| EP | 1 205 923 A1 | 5/2002 |
| EP | 1 420 398 A2 | 5/2004 |
| EP | 1 575 039 A1 | 9/2005 |
| EP | 1 596 384 A2 | 11/2005 |
| JP | 2001-297455 | 10/2001 |
| JP | 2004-55071 | 2/2004 |
| WO | WO 03/017263 A1 | 2/2003 |
| WO | WO 2004/053856 A1 | 6/2004 |

* cited by examiner

*Primary Examiner*—Tim Thompson
(74) *Attorney, Agent, or Firm*—Oblon, Spivak, McClelland, Maier & Neustadt, P.C.

(57) ABSTRACT

An optical pickup includes at least a laser light source emitting a laser beam, a collimator lens system including a plurality of lenses for collimating the light beam emitted from the laser light source and incident thereupon as diffused light, and an objective lens. The laser beam transmitted through the collimator lens system is incident upon the objective lens. The collimator lens system includes a first lens unit held so as to be movable in an optical axis direction of the laser beam and a fixed second lens unit.

8 Claims, 8 Drawing Sheets

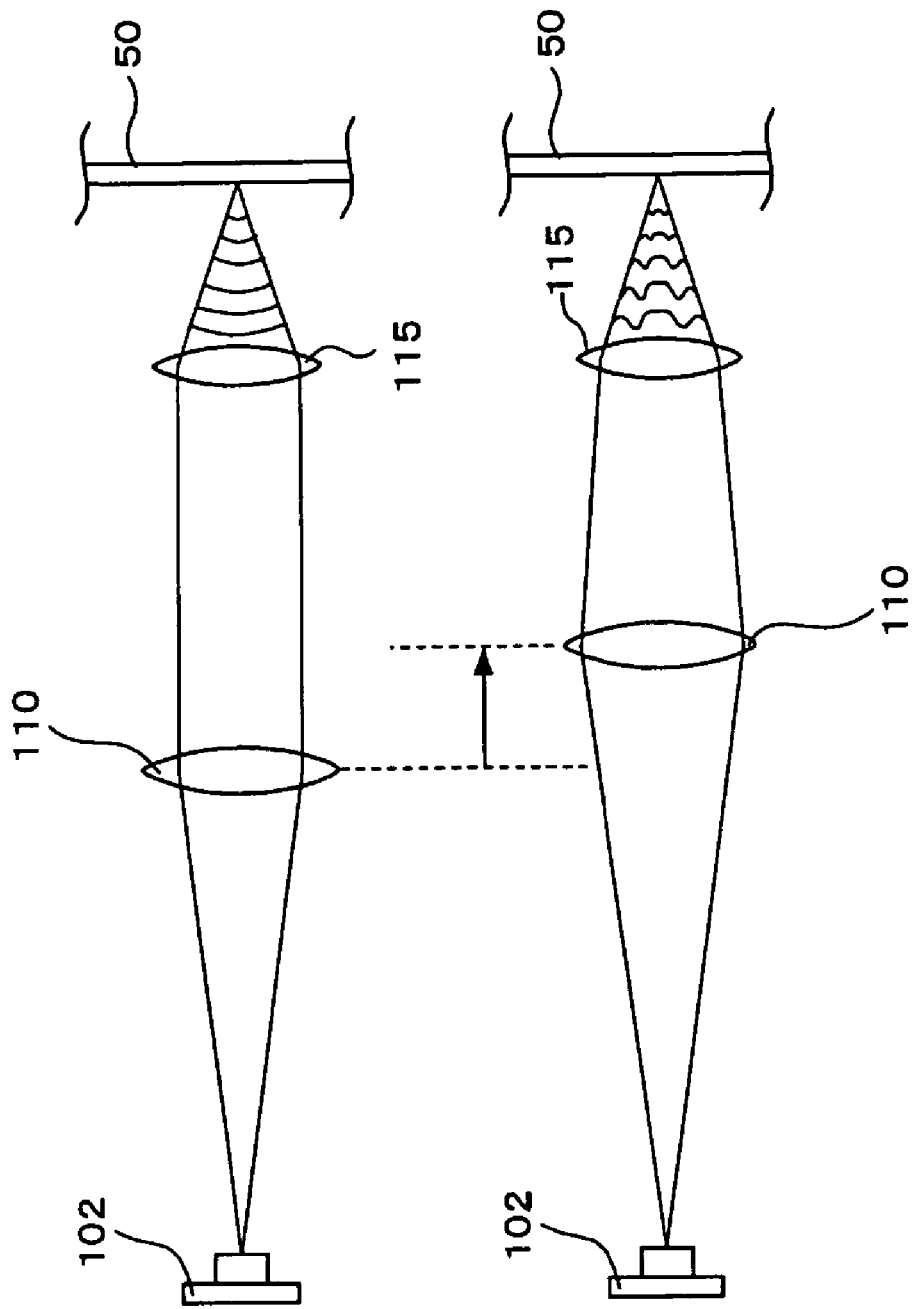

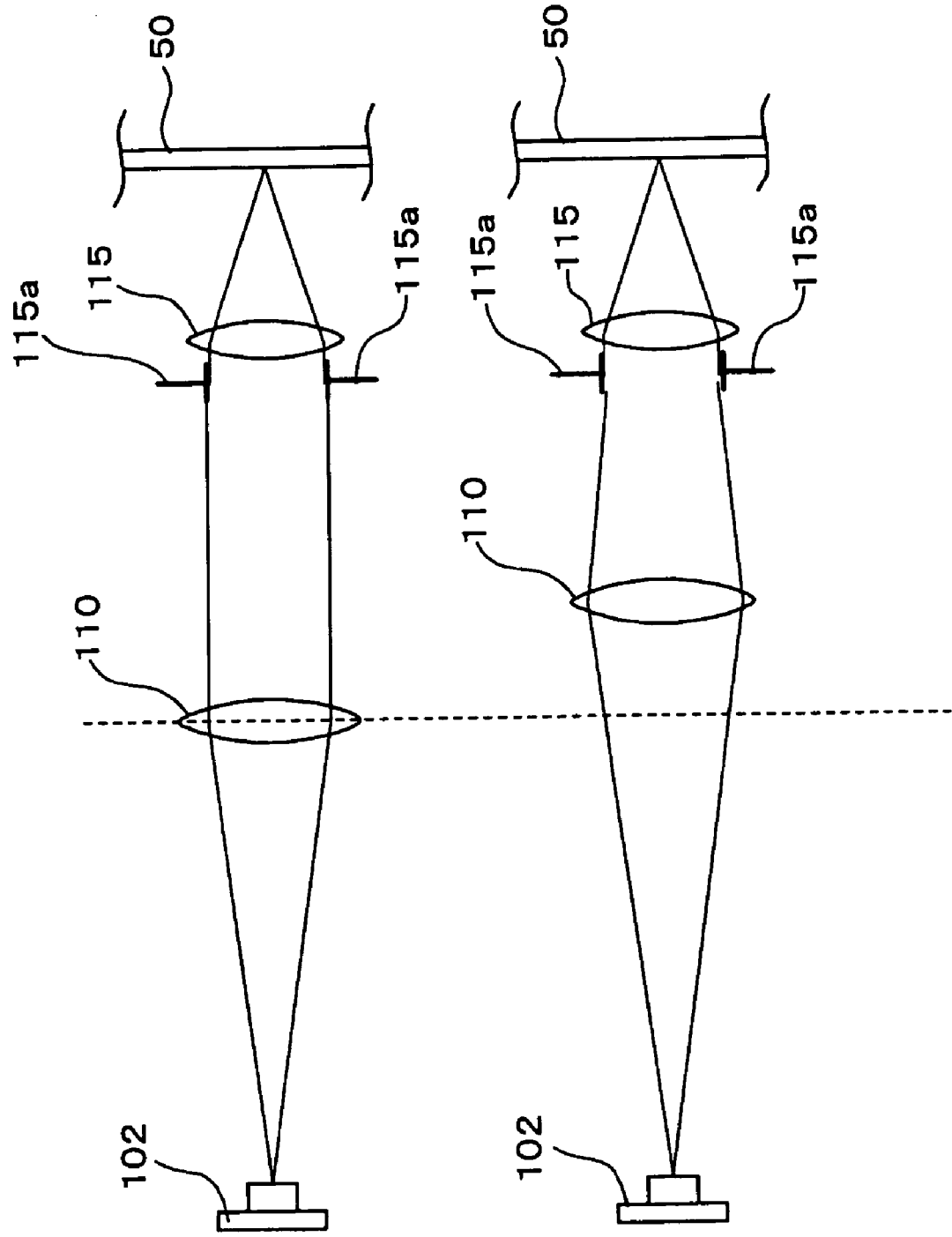

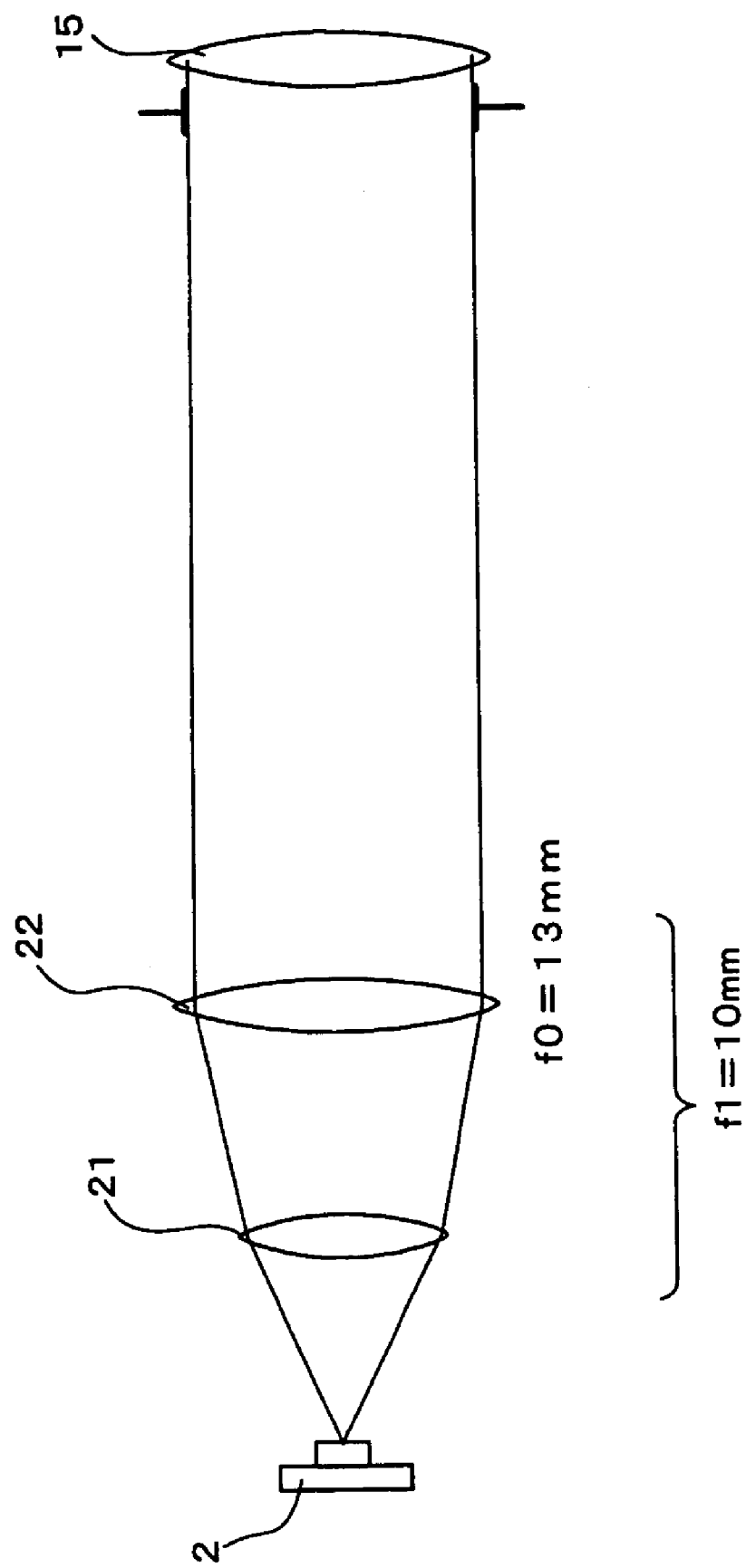

OPTICAL PICKUP AND OPTICAL DISC DEVICE

CROSS REFERENCES TO RELATED APPLICATIONS

The present invention contains subject matter related to Japanese Patent Application JP 2004-256821 filed in the Japanese Patent Office on Sep. 3, 2004, the entire contents of which are incorporated herein by reference.

BACKGROUND OF THE INVENTION

1. Field of the Invention

The present invention relates to an optical pickup and an optical disc device which uses the optical pickup for performing a recording and a reproducing operation on an optical disc recording medium, and, more particularly, to an optical disc device suitable for a structure which corrects spherical aberration by movement of a lens of a collimator lens system in an optical axis direction of a laser beam.

2. Description of the Related Art

FIG. 1 only shows the structure of an optical system in the structure of a related optical pickup 100.

In FIG. 1, first, a laser beam emitted from a laser 102 is rotated at a polarization angle at a ½ wavelength plate/grating 103 and is divided into three beams by a grating function. Of the three divided light beams, the light beam reflected by a polarization beam splitter 104 is transmitted through an illustrated convex lens 105 and is focused on a monitor photodetector 106. A signal obtained at the monitor photodetector 106 is used to control the intensity of the light beam with which a disc 50 is irradiated.

Of the divided light beams, the light beam transmitted through the polarization beam splitter 104 is transmitted through an illustrated convex lens 110.

The convex lens 110 functions as a collimator lens. The light transmitted through the convex lens 110 is generally collimated and is reflected by a reflective mirror 113. The convex lens 110 is also called a collimator lens 110.

The light reflected by the reflective mirror 113 is transmitted through an illustrated ¼ wavelength plate 114, and, then, passes through an objective lens 115 in order to be focused as a beam spot on a recording layer of the disc 50.

Light reflected from the recording layer of the disc 50 impinges upon the polarization beam splitter 104 by being transmitted through the aforementioned path in the reverse direction. The light is reflected here, is transmitted through an illustrated multi-lens 107, and impinges upon a signal detection photodetector 108. In this case, the multi-lens 107 used has a cylinder surface.

Reflected light information obtained at the signal detection photodetector 108 is used for generating an RF signal, various servo signals, and an address signal.

An optical system such as that shown in FIG. 1 is designed so that the amount of spherical aberration becomes a minimum when the thickness of a cover layer (hereunder referred to as "cover thickness") from a surface of the disc 50 to the recording layer is set at a value assumed to be a reference value under the condition that parallel light which has exited from the collimator lens 110 passes through the objective lens 115 in order for the recording layer of the disc 50 to be irradiated therewith.

Therefore, for example, when cover thicknesses differ according to discs 50, or when cover thicknesses at recording layers of multi-layered discs differ, spherical aberration occurs to a certain extent.

To overcome this problem, hitherto, it has been possible to correct spherical aberration when there are differences in the cover thicknesses according to discs 50 or when the discs 50 are multi-layered discs as mentioned above by forming the collimator lens 110 shown in FIG. 1 so as to be movable in an optical axis direction.

In other words, the collimator lens 110 is moved in the optical axis direction in order to move an object point of the objective lens 115 and vary a beam wave surface by this action, so that spherical aberration is corrected.

This will be described in more detail with reference to FIGS. 2A and 2B. FIGS. 2A and 2B only shows the laser 102, the collimator lens 110, and the objective lens 115 in the structure of the optical system shown in FIG. 1, and, thus, does not show the other components.

First, in FIG. 2A, the collimator lens 110 is at a reference position in a laser beam optical axis direction, and a laser beam which has exited from the collimator lens 110 is a substantially parallel light beam (light beam of an infinite system). The optical system is designed so that, in this state, the amount of spherical aberration becomes a minimum when the cover thickness of the disc 50 is a reference value.

FIG. 2B shows a state in which the collimator lens 110 is moved, for example, by a predetermined amount towards the objective lens 115 in the laser beam optical axis direction. Here, the laser beam which has exited from the collimator lens 110 is, as shown in the figure, not a parallel light beam but a converging light (light beam of a finite system).

According to the structure shown in FIG. 2B, a laser beam wave surface changes differently from a wave surface shown in FIG. 2A. This change causes the wave surface of the laser beam which has exited from the objective lens 115 to be subjected to a predetermined aberration.

Here, the amount of aberration which the laser beam is subjected to can be adjusted by the amount of movement of the collimator lens 110, so that, by the aberration, spherical aberration can be corrected in accordance with the differences in the cover thicknesses and differences in cover thicknesses according to recording layers.

SUMMARY OF THE INVENTION

The amount by which the collimator lens 110 is moved in the optical axis direction in order to correct spherical aberration as mentioned above varies depending upon the focal length of the collimator lens 110.

In other words, in this case, the wave surface aberration is proportional to the square of the numerical aperture NA of the objective lens 115. The NA is determined by radius÷focal length×refractive index of the objective lens 115.

Therefore, if the aperture of the objective lens is constant, the smaller the focal length, the larger the NA value. In other words, if the focal length is short, the wave surface can accordingly be considerably varied by the movement of the collimator lens 110. In contrast, if the focal length is long, the variation in the wave surface by the movement of the collimator lens 110 is small.

Therefore, if the focal length of the collimator lens 110 is short, in order to correct spherical aberration by the same amount, the amount by which the collimator lens 110 is moved is reduced. In contrast, if the focal length is long, the amount by which the collimator lens 110 is moved is increased.

The focal length of the collimator lens 110 is determined by two opposing factors, the efficiency with which the laser beam which has exited from the laser 102 is used and the diameter of the beam spot. Therefore, this value will lie within a certain range.

This will be described with reference to the next FIGS. 3A and 3B. FIGS. 3A and 3B also show only the laser 102, the collimator lens 110, and the objective lens 115 in the structure of the optical system shown in FIG. 1.

First, FIG. 3A shows an example of a case in which a focal length f of the collimator lens 110 is made short. When the focal length f of the collimator lens 110 is short, it is possible to correspondingly cause light to impinge upon the collimator lens 110 at a stage when the scattering of the laser light beam emitted from the laser 102 is relatively low as shown in the figure. In other words, this makes it possible for the efficiency with which the laser light beam emitted from the laser 102 is used to become relatively high.

However, when the focal length f of the collimator lens 110 is made short, the laser light beam incident upon the collimator lens 110 is such that the intensity of its center portion tends to be greater than the intensity of its peripheral portion as shown in the light intensity distribution by a thick line A in the figure. Therefore, the intensity of the peripheral portion of the light which exits towards the objective lens 115 is also low.

Therefore, the objective lens 115 cannot properly narrow the beam spot, resulting in a state that is equivalent to a state in which the numerical aperture NA of the objective lens 115 is reduced.

FIG. 3B shows an example of a case in which the focal length f of the collimator lens 110 is made long. In this case, the laser light beam emitted from the laser 102 in a relatively scattered state is incident upon the collimator lens 110, and is such that the difference between the intensity of its central portion and the intensity of its peripheral portion tends to be reduced as shown in the intensity distribution represented by a thick line B. Therefore, in this case, the laser spot can be properly narrowed, so that a state that is equivalent to a state in which the NA is increased can be achieved.

However, the laser beam emitted from the laser 102 is used with lower efficiency than in the case shown in FIG. 3A. Therefore, it may be difficult to obtain sufficient laser power when, for example, performing recording.

Therefore, the focal length f of the collimator lens 110 is set so that the diameter of the laser spot is equal to or less than a predetermined diameter and the efficiency with which the light is used is equal to or greater than a predetermined efficiency. Satisfying these conditions causes the focal length f of the collimator lens 110 to inevitably fall within a certain range.

The specific numerical value of the focal length f of the collimator lens 110 which inevitably falls within a certain range in view of both the diameter of the laser spot and the efficiency with which the light is used may be set relatively long or relatively short depending upon the conditions of other elements making up the optical system.

When the focal length f of the collimator lens 110 is to be long, as can be understood from the aforementioned illustration in FIGS. 2A and 2B, the amount by which the collimator lens 110 is moved in order to correct spherical aberration is correspondingly increased.

When the amount by which the collimator lens 110 is moved in order to correct spherical aberration is increased, the distance between the collimator lens 110 and the reflective mirror 113 is correspondingly increased, thereby preventing the size of the optical system from being reduced.

Accordingly, when the focal length f of the collimator lens 110 is to be long, the following problems may occur.

Here, as shown in the next FIGS. 4A and 4B, a diaphragm (that is, a diaphragm 115a of the objective lens) for incident light from the collimator lens 110 is disposed at the objective lens 115. The objective lens diaphragm 115a is disposed to cause light to impinge upon a proper effective diameter of the objective lens 115.

FIGS. 4A and 4B show a state in which the collimator lens 110 is at its reference position and a state in which the collimator lens 110 is moved in the laser beam optical axis direction, respectively. Here, in both of the cases shown in FIGS. 4A and 4B, the objective lens diaphragm 115a can function so that the intensities of light incident upon the objective lens 115 are substantially the same depending upon where the objective lens diaphragm 115a is disposed.

In other words, it is known that, when the objective lens diaphragm 115a is disposed near the rear focal point of the collimator lens 110, variations in the intensity of the light exiting from the objective lens 115 can be set to a minimum.

From such a circumstance, in general, the distance from the collimator lens 110 to the objective lens 115 is set substantially equal to the focal length of the collimator lens 110.

When the collimator lens 110 and the objective lens 115 are disposed as mentioned above, making the focal length of the collimator lens 110 long as mentioned above makes it necessary to correspondingly increase the distance from the collimator lens 110 to the objective lens 115 (the objective lens diaphragm 115a).

In other words, from this point also, when the focal length f of the collimator lens 110 is to be long, it is difficult to reduce the size of the optical system.

In contrast, if the focal length f of the collimator lens 110 must be short, according to the foregoing description, the distance between the collimator lens 110 and the objective lens 115 can be made short to reduce the size of the optical system. However, if, for example, the focal length f is too short, the objective lens diaphragm 115a and the reflective mirror 113 may interfere with each other.

Accordingly, in the structure of the related optical system, the focal length f of the collimator lens 110 is determined to a value within a certain range due to the relationship with other structural elements of the optical system and in view of the diameter of the laser spot and the efficiency with which the laser beam is used. Therefore, various problems may arise.

Accordingly, it is desirable to provide an optical pickup which allows the focal length of a collimator lens to be set with freedom and an optical disc device using the same.

Therefore, according to an embodiment of the present invention, there is provided an optical pickup including at least a collimator lens system and an objective lens, the collimator lens system including a plurality of lenses for collimating a light beam emitted from a laser light source and the laser beam transmitted through the collimator lens system being incident upon the objective lens. The collimator lens system includes a first lens unit held so as to be movable in an optical axis direction of the laser beam and a fixed second lens unit.

In the collimator lens system, the lens unit that is closer to the laser light source may include a concave lens system and the other lens unit may include a convex lens system.

Alternatively, in the collimator lens system, the first lens unit and the second lens unit each include a convex lens system.

If, as in the above-described structure, the collimator lens system includes two lens units, even if the focal length of the entire collimator system is to be set to a certain value, the lens focal length of one of the lens units can be set with a certain degree of freedom according to the setting of the lens focal length of the other lens unit.

In other words, even if the focal length of the entire collimator lens system is to be set to a value within a certain range as mentioned above in view of the diameter of a laser spot and the efficiency with which a laser beam is used, the above-described structure makes it possible for the focal length of the convex lens held so as to be movable for, for example, correcting spherical aberration to be set with a certain degree of freedom by the setting of the lens focal length of the other lens unit.

For example, if the collimator lens system has a structure in which a concave lens system and a convex lens system are disposed from a side of the laser light source (what is called a telephoto system structure), the focal length of the convex lens system can be set shorter than the focal length of the entire collimator lens system.

Alternatively, if the collimator lens system has a structure including a convex lens system and a convex lens system, the focal length of one of the convex lens systems can be set longer than the focal length of the entire collimator lens system.

Accordingly, according to an embodiment of the present invention, forming the collimator lens system so as to have two lens units makes it possible to set the focal length of one of the lens units with a certain degree of freedom by the setting of the focal length of the other lens unit. Here, even if the focal length of the entire collimator lens system is determined to a certain value in view of the diameter of a laser spot and the efficiency with which a laser beam is used, the focal length of one of the lens units can be set with a certain degree of freedom.

In addition, if, for example, the collimator lens system has a telephoto system structure in which a concave lens system and a convex lens system are disposed from a side of the laser light source, the focal length of the convex lens system can be set shorter than the focal length of the entire collimator lens system.

According to the above, even if the focal length of the entire collimator lens system must be set relatively long, the focal length of the convex lens system can be set relatively short. Therefore, the amount by which a lens of the convex lens system is moved for correcting spherical aberration can be reduced.

Since the amount by which a lens of the convex lens system is moved for correcting spherical aberration can be reduced, even if the focal length of the collimator lens system has to be set long as mentioned above, the optical system can be reduced in size.

In addition, if the amount by which a lens of the convex lens system is moved for correcting spherical aberration can be reduced, it is possible to correspondingly set the distance between the convex lens and the diaphragm of the objective lens shorter, so that, even due to this, the optical system can be reduced in size.

For example, if the collimator lens system has a two lens unit structure including a convex lens system and a convex lens system, the focal length of one of the convex lens systems can be set longer than the focal length of the entire collimator lens system. According to this structure, even if the focal length of the collimator lens system is to be made short, the focal length of the convex lens in the lens unit closer to the objective lens can be set longer than the focal length of the collimator lens system. Therefore, it is possible to prevent interference between the reflective mirror and the diaphragm of the objective lens.

BRIEF DESCRIPTION OF THE DRAWINGS

FIGS. 2A and 2B illustrate the correction of spherical aberration by the movement of a collimator lens;

FIGS. 4A and 4B illustrate the relationship between the positions of the collimator lens and an objective lens;

FIG. 9 illustrates a specific example of the focal length of a collimator lens system and the focal length of a convex lens in the second embodiment.

DESCRIPTION OF THE PREFERRED EMBODIMENTS

The best mode (hereunder referred to as "embodiment") for carrying out the invention will hereunder be described.

Figure 5:
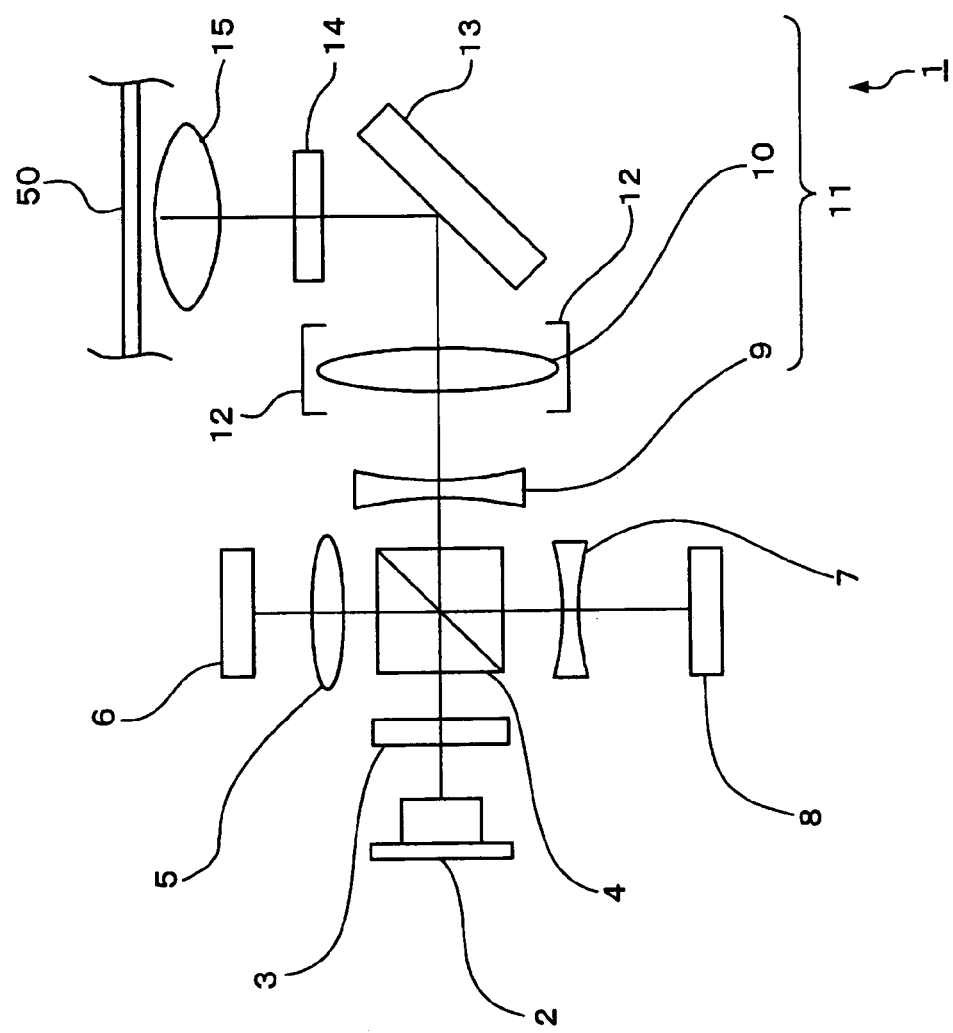
FIG. 5 primarily shows only the structure of an optical system in an optical pickup according to a first embodiment of the present invention.

FIG. 5 primarily shows only the structure of an optical system in an optical pickup 1 according to a first embodiment.

In FIG. 5, first, a laser beam emitted from a laser 2 is rotated at a polarization angle at a ½ wavelength plate/grating 3 and is divided into three beams by the grating. Of the three divided light beams, the light beam reflected by a polarization beam splitter 4 passes through an illustrated convex lens 5 and is focused on a monitor photodetector 6. A signal obtained at the monitor photodetector 6 is used to control the intensity of the laser beam with which a disc 50 is irradiated.

Although the ½ wavelength plate and the grating are here formed as an integral part, they may be formed as separate parts.

Of the divided laser beams, the light beam that has passed through the polarization beam splitter 4 is as diffused light incident upon an illustrated concave lens 9 and an illustrated convex lens 10 in that order.

The concave lens 9 and the convex lens 10 form a collimator lens system 11. The light transmitted through the concave lens 9 and the convex lens 10 is generally collimated and is reflected by a reflective mirror 13.

The light reflected by the reflective mirror 13 is transmitted through an illustrated ¼ wavelength plate 14 and then passes through an objective lens 15 in order to be focused as a beam spot on a recording layer of the disc 50.

The light reflected from the recording layer of the disc 50 impinges upon the polarization beam splitter 4 through the same path in the reverse direction. The light is reflected by the polarization beam splitter 4, is transmitted through an illustrated multi-lens 7, and impinges upon a signal detection photodetector 8. In this case, the multi-lens 7 used has a cylinder surface.

Reflected light information obtained at the signal detection photodetector 8 is used for generating an RF signal, various servo signals, and an address signal.

The optical system described above is designed so that the amount of spherical aberration becomes a minimum when the thickness of a cover layer (hereunder referred to as "cover thickness") from a surface of the disc 50 to the recording layer is set at a reference value under the condition that parallel light which has exited from the collimator lens system 11 passes through the objective lens 15 in order for the recording layer of the disc 50 to be irradiated therewith.

Therefore, for example, when cover thicknesses differ according to discs 50, or when cover thicknesses at recording layers of multi-layered discs differ, spherical aberration occurs to a certain extent.

To overcome this problem, even in the optical pickup 1 according to the first embodiment, a lens of the collimator lens system 11 is formed so as to be movable in an optical axis direction of the laser beam in order to correct spherical aberration when there are differences in the cover thicknesses according to discs 50 or when the discs 50 are multi-layered discs as mentioned above.

In other words, as shown in FIG. 5, in this case, a lens driver 12 is provided for moving the convex lens 10 of the collimator lens system 11 in the optical axis direction of the laser beam.

The lens driver 12 operates to move the convex lens 10 in the optical axis direction of the laser beam in accordance with a drive signal from a drive circuit (not shown).

By moving the convex lens 10 in the optical axis direction by the lens driver 12 in this way, as previously described with reference to FIGS. 2A and 2B, the laser beam which has exited from the convex lens 10 becomes a light beam of a finite system. Therefore, the wave surface of the laser beam incident upon the objective lens 15 is varied.

By varying the wave surface of the laser beam incident upon the objective lens 15 in this way, the laser beam which has exited from the objective lens 15 is subjected to a predetermined wave surface aberration in accordance with the amount of movement of the convex lens 10, so that spherical aberration can be corrected.

As can be understood from the foregoing description, according to the optical pickup 1 of the first embodiment, the collimator lens system 11 includes two lens units, that is, the convex lens 10 (first lens unit) held so as to be movable in the optical axis direction of the laser beam by the lens driver 12 and the fixed concave lens 9 (second lens unit).

More specifically, the collimator lens system 11 has what is called a telephoto system structure in which the concave lens 9 and the convex lens 10 are disposed consecutively from a side of the laser 2 serving as a laser light source in that order.

Accordingly, by forming the collimator lens system 11 so as to have two lens units, the focal length of the collimator lens system 11 is equal to the combined lens focal lengths of the lens units. According to this, even if the focal length of the collimator lens system 11 must be set to a certain value, the focal length of one of the lenses can be set with a certain degree of freedom according to the setting of the focal length of the other lens.

In the first embodiment, by using the telephoto system structure, the focal length of the collimator lens system 11, which is equal to the combined focal lengths of the concave lens 9 and the convex lens 10, is longer than the focal length of the convex lens 10.

In other words, according to such a telephoto system structure, the focal length of the convex lens 10 is shorter than the focal length of the collimator lens system 11.

Figure 6:
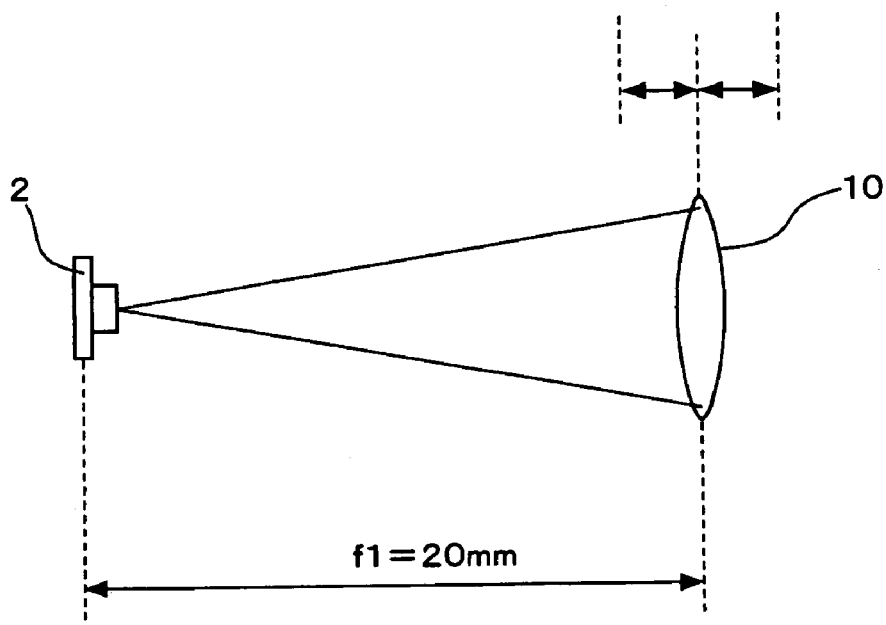
FIG. 6 illustrates a specific example of the focal length of a convex lens when a collimator lens system has a related structure including one lens unit.
Figure 7:
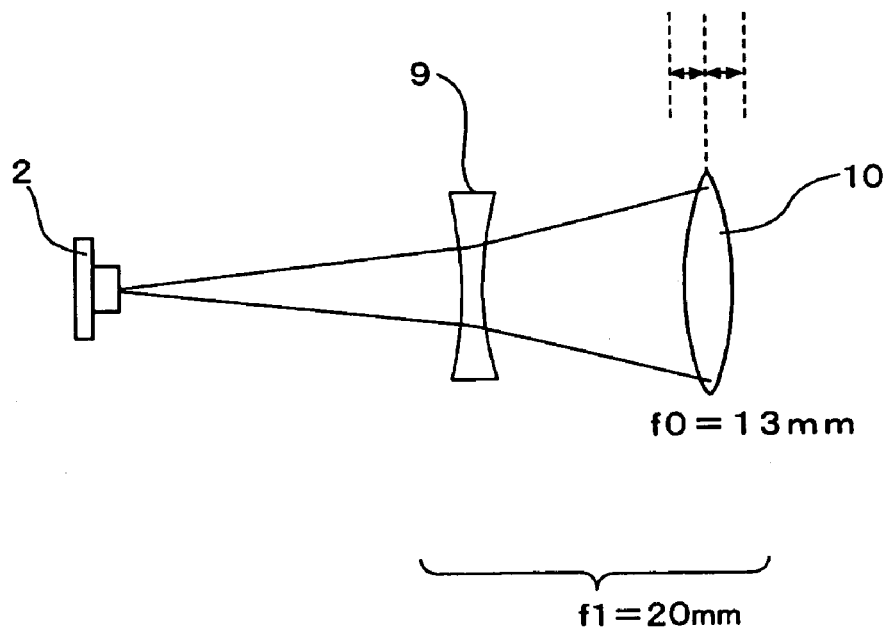
FIG. 7 illustrates a specific example of the focal length of a collimator lens system and the focal length of a convex lens in the first embodiment.

The first embodiment in which the collimator lens system 11 has a telephoto system structure including two lens units, that is, the concave lens 9 and the convex lens 10, and a related example in which a collimator lens system 11 includes only one lens unit, that is, a convex lens 10 will be compared with reference to the following FIGS. 6 and 7.

In these figures, a/the laser 2, and the concave lens 9, and the convex lens 10 in a/the optical system of a/the optical pickup 1 will only be shown. The other parts are not shown.

Of these figures, FIG. 6 shows a case in which the collimator lens system 11 has only one lens unit as in related example, and FIG. 7 shows a case in which the collimator lens system 11 has a telephoto system structure including two lens units as mentioned above.

Figure 1:
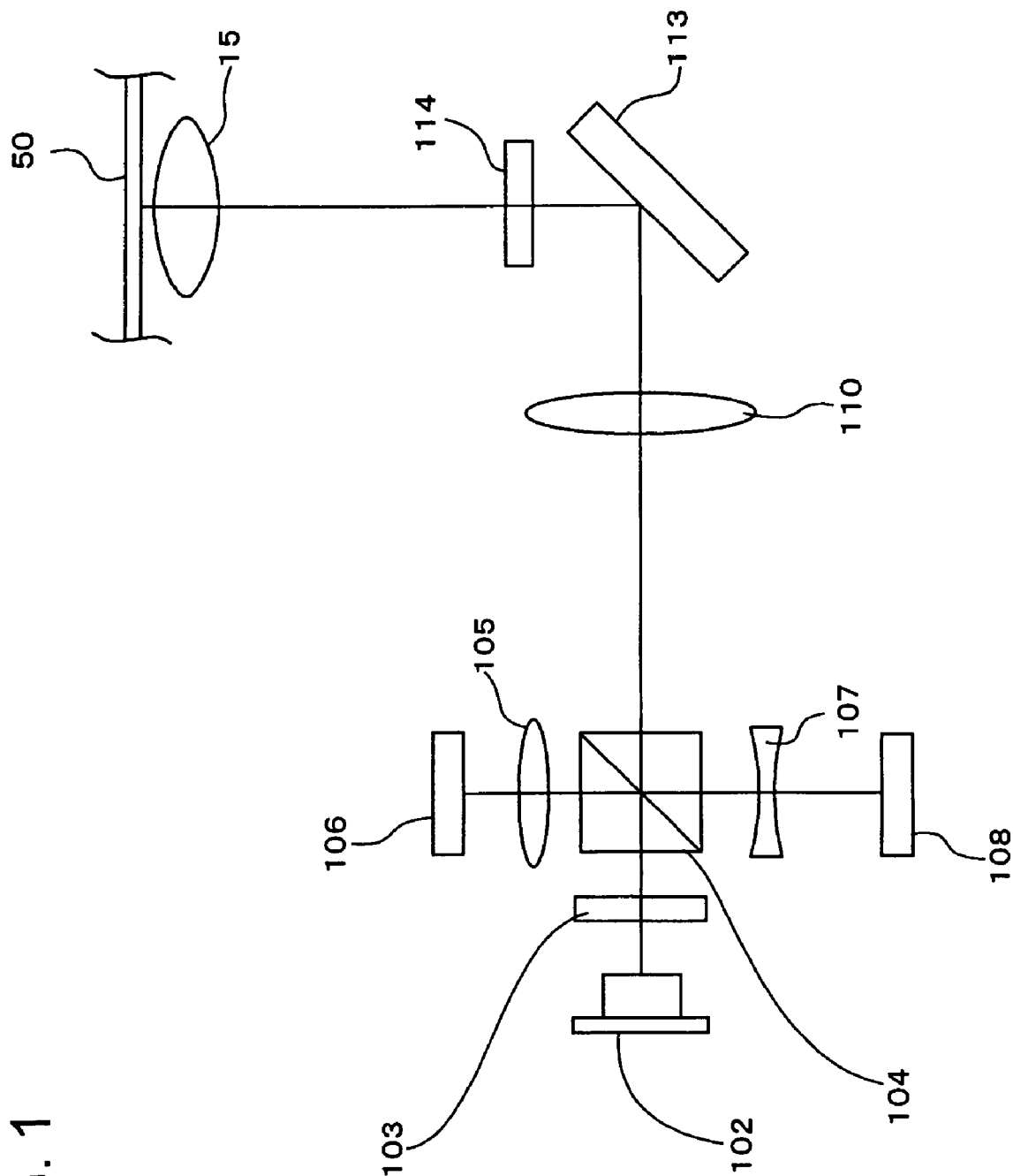
FIG. 1 shows the structure of a related optical system.
Figure 3A:
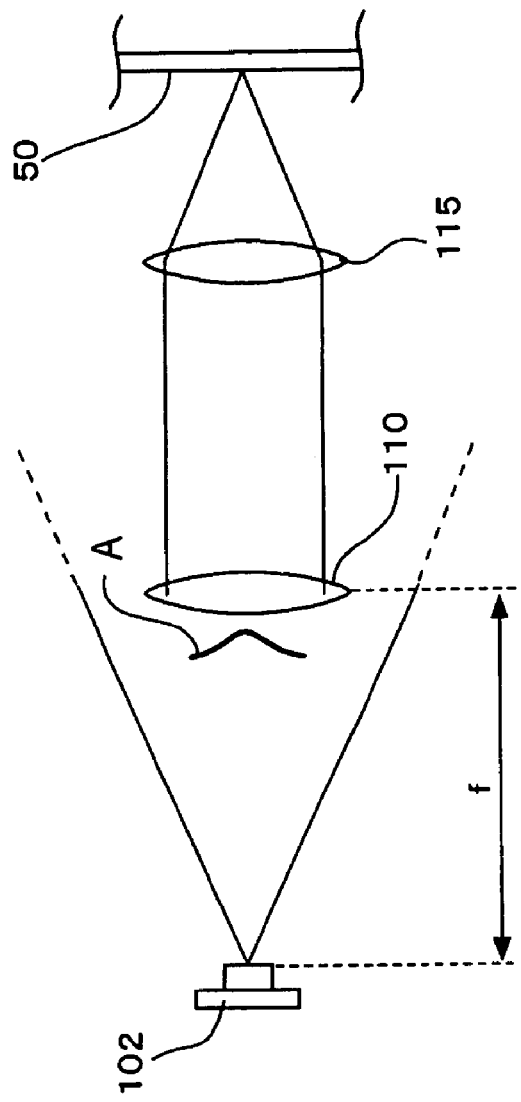
FIGS. 3A and 3B illustrate the setting of the focal length of the collimator lens.
Figure 3B:
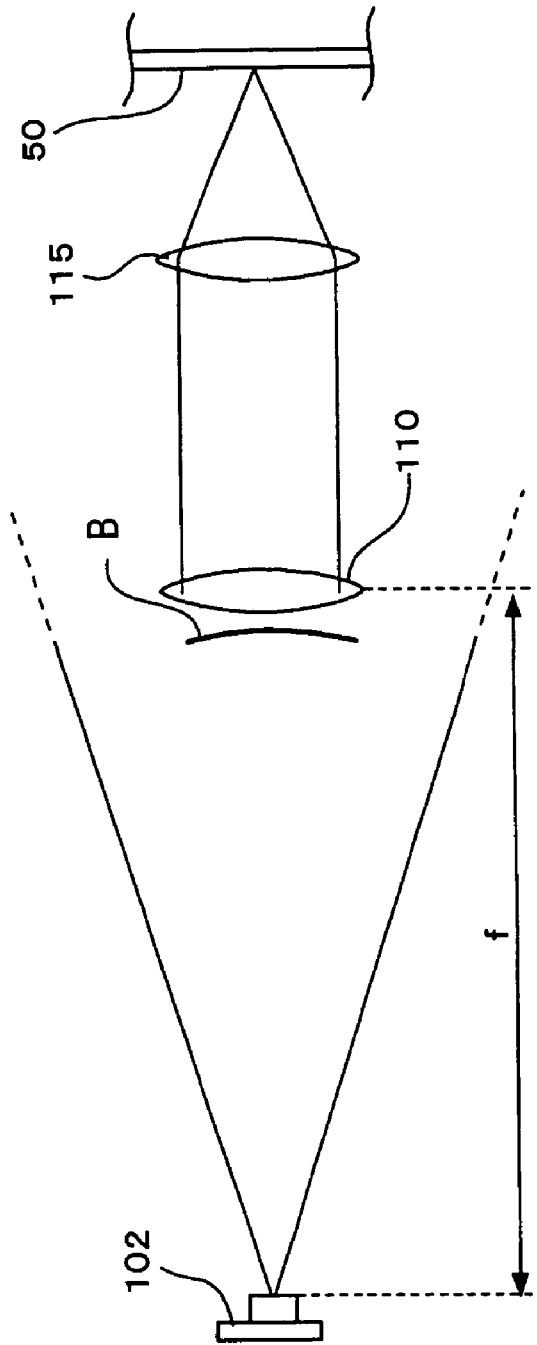

As previously described with reference to FIGS. 3A and 3B, the diameter of a laser spot formed by the objective lens 15 and the efficiency with which a laser beam emitted from the laser 2 is used are determined depending upon the setting of the focal length of the collimator lens system. In other words, a focal length f1 of the collimator lens system is determined to a value within a certain range in view of the diameter of the laser spot and the efficiency with which light is used.

For example, in this case, the focal length f1 of the collimator lens system is assumed as being set at 20 mm in view of the diameter of the laser spot and the efficiency with which light is used.

First, in the example shown in FIG. 6, since the collimator lens system has only one lens unit, that is, the convex lens 10, the focal length of the convex lens 10 is equal to the focal length f1. In other words, the focal length of the convex lens 10 is set at 20 mm.

In contrast, in the example shown in FIG. 7, since the structure including two lens units is used, the focal length f of the collimator lens system can be equal to the combined focal lengths of the concave lens 9 and the convex lens 10.

In addition, in this case, incorporating the concave lens 9 with respect to the convex lens 10 so as to form the telephoto system structure makes it possible for a focal length f0 of the convex lens 10 to be shorter than the focal length f1 of the entire collimator lens system. For example, when the focal length f1 of the collimator lens system 11 is equal to 20 mm, the focal length f0 of the convex lens 10 is set at 13 mm.

Accordingly, when the telephoto system structure including two lens units is used, the focal length of the convex lens 10 which is driven in the laser beam optical axis direction for correcting spherical aberration can be shorter than the focal length in the structure including only one lens unit.

Accordingly, since it is possible for the focal length of the convex lens 10 to be set short, the amount by which the convex lens 10 is moved for correcting spherical aberration can be less than the amount of movement in the structure including one lens unit.

In other words, as previously described, the aberration of the wave surface of a laser beam emitted from the objective lens 15 is proportional to the square of the numerical aperture NA of the objective lens 15. The NA is determined by radius÷focal length×refractive index of the objective lens 15. Therefore, if the focal length can be small, the amount of wave surface aberration can be increased in correspondence with a squared amount.

In addition, according to this, since the focal length can be reduced, the amount by which the convex lens 10 is moved for correcting spherical aberration can be reduced in correspondence with a squared amount.

More specifically, in the structure including only one lens unit, the focal length of the convex lens 10 is 20 mm, whereas, in the first embodiment, the focal length of the convex lens 10 can be 13 mm. Therefore, $$(13 \div 20)^2 = 0.4$$

As a result, the amount of movement of the convex lens 10 can be reduced to approximately 0.4 times the amount of movement in the structure including only one lens unit.

Accordingly, if the amount by which the convex lens 10 is moved for correcting spherical aberration can be reduced, the interval between the convex lens 10 and the reflective mirror 13 can be reduced accordingly, so that the optical system can be reduced in size.

In addition, if the amount by which the convex lens 10 is moved for correcting spherical aberration can be reduced, the driving amount of a motor in the lens driver 12 can be reduced. Therefore, it is possible to reduce the size and the driving power of the motor.

If the focal length of the convex lens 10 can be reduced as in the above-described manner, the convex lens 10 and the objective lens 15 can correspondingly be disposed closer to each other.

In other words, as previously described with reference to FIGS. 4A and 4B, a diaphragm for causing light emitted from the convex lens 10 of the collimator lens system to properly impinge upon an effective diameter is actually provided at the objective lens 15 (objective lens diaphragm 115*a* in FIGS. 4A and 4B).

Since, from the viewpoint of calculation, variations in the intensity of the light exiting from the objective lens 15 can be a minimum when such a diaphragm is disposed near the rear focal point of the convex lens 10, the convex lens 10 and the objective lens 15 are actually disposed so as to be separated by an interval substantially equal to the focal length of the convex lens 10.

Therefore, according to the first embodiment in which the focal length of the convex lens 10 can be set short, the distance between the convex lens 10 and the objective lens 15 can be correspondingly reduced. Since the distance between the convex lens 10 and the objective lens 15 can be reduced, the optical system is reduced in size.

Although, in the first embodiment, as viewed from the laser light source, the concave lens 9 is disposed behind the polarization beam splitter 4, that is, further away from the laser light source 2 than the polarization beam splitter 4, the concave lens 9 may be disposed in front of the polarization beam splitter 4. In other words, the concave lens 9 may be disposed between the polarization beam splitter 4 and the ½ wavelength plate/grating 3.

However, from the viewpoint of lens design, it is better to dispose the concave lens 9 behind the polarization beam splitter 4 as shown in FIG. 5.

In other words, in this case, it is generally desirable for the focal length at the side of the signal detection photodetector 8 (focal length of the concave lens 9, convex lens 10, and multi-lens 7) to be longer than the focal length at the side where irradiation using laser is performed on the optical disc (focal length of the concave lens 9 and convex lens 10). Therefore, actually, in order to set the focal length of the concave lens 9, convex lens 10, and multi-lens 7 longer than the focal length of the concave lens 9 and convex lens 10, the refractive power of the multi-lens 7 is set so as to be negative.

Considering such an assumption, if, as mentioned above, the concave lens 9 is disposed in front of the polarization beam splitter 4, the negative refractive power of the multi-lens 7 must be increased because the concave lens 9 is not interposed. This is not advantageous from the viewpoint of the design of the multi-lens 7. Therefore, it is desirable for the concave lens 9 to be disposed behind the polarization beam splitter 4 as shown in FIG. 5.

Although, in the first embodiment, the convex lens 10 is driven for correcting spherical aberration, the concave lens 9 may be driven.

However, even here, it is better to drive the convex lens 10 as in the structure shown in FIG. 5.

If the concave lens 9 is driven, in order for the drive distance required for correcting spherical aberration to be a practical value, the power of the concave lens 9 is set larger. Therefore, the power of the convex lens 10 is also set large. Accordingly, in this case, the power of both the concave lens 9 and the power of the convex lens 10 are set large. As a result, driving the concave lens 9 is correspondingly disadvantageous from the viewpoint of lens design. Consequently, from the viewpoint of lens design, it is better to use the structure in which the convex lens 10 is driven.

Next, the structure of an optical pickup 20 according to a second embodiment will be described with reference to FIG. 8.

Figure 8:
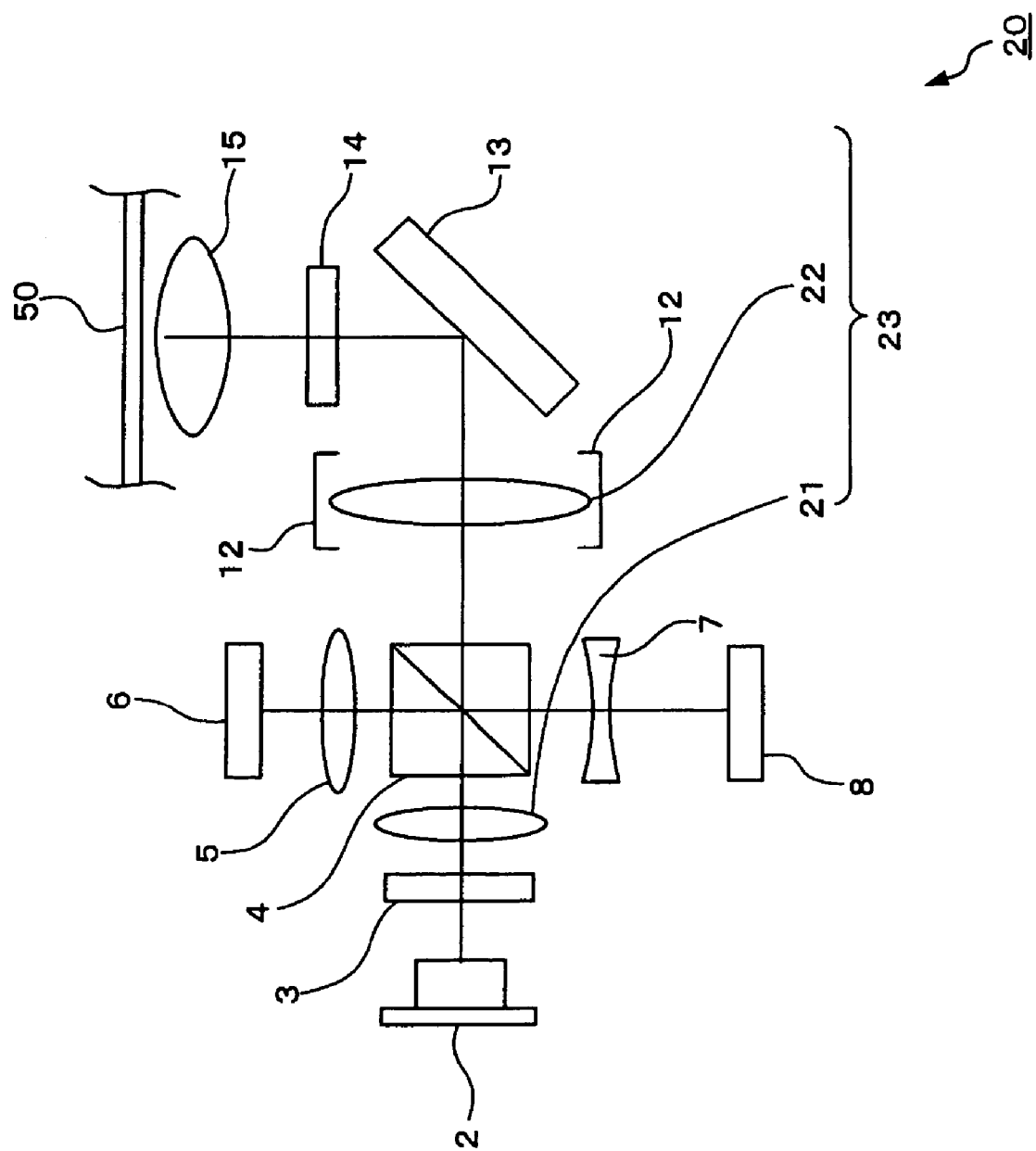
FIG. 8 primarily shows only the structure of an optical system in an optical pickup according to a second embodiment of the present invention.

FIG. 8 primarily shows only the structure of an optical system in the optical pickup 20 according to the second embodiment.

In the figure, corresponding parts to those described in FIG. 5 are given the same reference numerals and will not be described.

In the optical pickup 20 according to the second embodiment, the structure of a collimator lens system includes two lens units, a convex lens 21 (second lens unit) and a convex lens 22 (first lens unit) as shown in the figure.

In this case, as shown in the figure, the convex lens 21 is disposed between a ½ wavelength plate/grating 3 and a polarization beam splitter 4. The convex lens 22 is disposed between the polarization beam splitter 4 and a reflective mirror 13. In other words, as viewed from the side of a laser light source, the convex lens 21 is disposed in front of the polarization beam splitter 4, and the convex lens 22 is disposed behind the polarization beam splitter 4.

Based on this, the convex lens 22 is formed so as to be movable in a laser beam optical axis direction by a lens driver 12.

In the second embodiment, the collimator lens system including the convex lens 21 and the convex lens 22 is called a collimator lens system 23.

Here, in the second embodiment, the convex lens 21 is disposed in front of the polarization beam splitter 4 as mentioned above. This is because, contrary to the first embodiment, the refractive power of the multi-lens 7 can be small when the convex lens 21 is disposed in front of the polarization beam splitter 4, and this is advantageous from the viewpoint of the design of the multi-lens 7.

However, even in this case, if the lens design is not considered, the convex lens 21 can in principle be disposed behind the polarization beam splitter 4 (between the polarization beam splitter 4 and the convex lens 22).

In the second embodiment, if the convex lens 21 is disposed behind the polarization beam splitter 4, the lens that is driven for correcting spherical aberration may be either the convex lens 21 or the convex lens 22.

However, even here, due to the same reason as that in the previous first embodiment, it is better to use the structure in which the convex lens 22 is driven from the viewpoint of lens design.

When, as mentioned above, the collimator lens system 23 has a structure including two lens units, the convex lens 21 and the convex lens 22, the focal length of the collimator lens system 23 can also be equal to the combined focal lengths of the convex lenses 21 and 22.

In addition, in this case, since the lenses are both convex lenses, the focal length of one of the convex lenses is longer than the focal length of the collimator lens system 23.

In other words, in this case, the focal length of one of the convex lenses can be set longer than the focal length of the collimator lens system 23.

A specific example of the focal length of each convex lens in the collimator lens system 23 in the second embodiment will be given with reference to the following FIG. 9. FIG. 9 shows only the laser 2, the convex lens 21, the convex lens 22, and the objective lens 15 in the optical system in the second embodiment. The other parts are not shown.

For example, in the optical system in this case, a focal length f1 of the collimator lens system 23 is set at, for example, 10 mm in view of the diameter of a laser spot and the efficiency with which light is used as mentioned above.

In this case, the focal length of one of the convex lenses can be set longer than the focal length f1 of the collimator lens system 23 as mentioned above. In accordance with this, a focal length f0 of the convex lens 22, which is driven by the lens driver 12, is set at 13 mm, which is longer than the focal length f1 of the collimator lens system 23.

If the focal length f0 of the convex lens 22 can be set longer than the focal length f1 of the collimator lens system 23, when, for example, the focal length f1 of the collimator lens system 23 is to be set relatively short, the focal length f0 of the convex lens 22 can be set long.

If the focal length of the convex lens 22, which corresponds to the lens unit disposed closer to the objective lens 15, can be set relatively long, the distance between the convex lens 22 and a diaphragm of the objective lens 15 can be set correspondingly long.

According to this, even if the focal length of the collimator lens system is to be set short, the reduction in the distance between the convex lens 22 and the diaphragm of the objective lens 15 can be restricted, thereby making it possible to prevent the reflective mirror 13 and the diaphragm of the objective lens 15 from interfering with each other.

The embodiments of the invention have been described above. In the first embodiment, the concave lens 9 and the convex lens 10 of the collimator lens system 11 are combined in order to make it possible to set the focal length of the convex lens 10 shorter than the focal length of the entire collimator lens system 11.

In the second embodiment, the convex lenses 21 and 22 of the collimator lens system 23 are combined in order to make it possible to set the focal length of the convex lens 22 longer than the focal length of the entire collimator lens system 23.

Here, as will be examined using the following lens power formulas.

First, the first embodiment will be examined.

Here, the power of the convex lens 10 is $\phi1$, the power of the concave lens 9 is $\phi2$, and the distance between the convex lens 10 and the concave lens 9 is D.

From the combined lens power formula, the combined lens power of the convex lens 10 and concave lens 9 is:

$$\phi1+\phi2-\phi1\cdot\phi2\cdot D$$

Here, the lens power is the reciprocal of the lens focal length. That is, the reciprocal of the value obtained by the above formula represents a value equal to the combined focal lengths of the convex lens 10 and concave lens 9.

As mentioned in the first embodiment, if the focal length of the convex lens 10 is shorter than the combined focal lengths of the convex lens 10 and concave lens 9, since the lens power is the reciprocal of the focal length as mentioned above, the following relationship is established:

$$\phi1+\phi2-\phi1\cdot\phi2\cdot D<\phi1$$

Rearranging the terms, the relationship becomes:

$$\phi2-\phi1\cdot\phi2\cdot D<0, \text{ that is, } \phi2(1-\phi1\cdot D)<0$$

Here, considering that $\phi2$, which represents the power of the concave lens 9, is a negative value, the aforementioned formula becomes as follows:

$$1-\phi1\cdot D>0$$

It can be understood that, in order to establish the relationship of the formula, the product of the lens power $\phi1$, which is the reciprocal of the focal length of the convex lens 10, and the distance D between the lenses must be less than 1. In other words, if the distance D between the lenses is less than the focal length of the convex lens 10, the previously indicated relationship $\phi1+\phi2-\phi1\cdot\phi2\cdot D<\phi1$ is established, so that the focal length of the convex lens 10 is less than the focal length of the entire collimator lens system 11.

Accordingly, in order for the focal length of the convex lens 10 to be less than the focal length of the entire collimator lens system 11 in the first embodiment, the distance D between the lenses must be less than the focal length of the convex lens 10.

However, in general, the distance D between the lenses cannot be actually made so large. Therefore, in most cases, the structure shown in FIG. 5 is used to allow the focal length of the convex lens 10 to be less than the focal length of the entire collimator lens system 11.

If the distance D between the lenses is longer than the focal length of the convex lens 10, when, by the aforementioned formula, the power $\phi2$ of the other lens of the collimator lens system 11 is positive, the focal length of the convex lens 10 can be less than the focal length of the entire collimator lens system 11.

In other words, if the distance D between the lenses is longer than the focal length of the convex lens 10, disposing a convex lens instead of the concave lens 9 makes it possible to make the focal length of the convex lens 10 shorter than the focal length of the entire collimator lens system 11. Therefore, the previously mentioned advantages of the first embodiment can be provided.

In the second embodiment, similarly, if the power of the convex lens 22 is $\phi1$ and the power of the convex lens 21 is $\phi2$, when, for example, the focal length of the convex lens 22 is longer than the focal length of the collimator lens system 23, the following relationship is established:

$$\phi1+\phi2-\phi1\cdot\phi2\cdot D \text{ (distance between the lenses)}>\phi1$$

In other words, the following relationship is established:

$$\phi2(1-\phi1\cdot D)>0$$

Here, since $\phi2$, which represents the power of the convex lens 21, is a positive value, the aforementioned relationship ultimately becomes as follows:

$$1-\phi1\cdot D<0$$

In other words, in this case, contrary to the first embodiment, when the product of $\phi1$, which is the reciprocal of the focal length of the convex lens 22, and the distance D between the lenses is greater than 1, the aforementioned relationship is established. That is, if the distance D between the lenses is longer than the focal length of the convex lens 22, the relationship in which the focal length of the convex lens 22 is longer than the focal length of the entire collimator lens system 23 is established.

In this case, in contrast, in order to meet the condition that the distance D between the lenses is less than the focal length of the convex lens 22, if the other lens of the collimator lens system is a concave lens instead of the convex lens 21, the relationship of the aforementioned formula can be established, so that the previously mentioned advantages of the second embodiment can be provided.

Here, the structure of the optical pickup is not limited to those of the embodiments that have been described up to now.

For example, although, in each of the embodiments, the first lens unit and the second lens unit of the collimator lens system are each a single lens, they may each be a combination lens, such as a doublet lens, depending upon, for example, the actual conditions of occurrence of the various aberrations.

In other words, the collimator lens system of the present invention may include one or a plurality of lenses (first lens unit) movable in a laser beam optical axis direction for correcting spherical aberration and one or a plurality of fixed lenses (second lens unit).

As can be understood from the above, the term "unit" in lens unit in the present invention refers to a unit including one or a plurality of lenses which are movable for correcting spherical aberration and to a unit including one or a plurality of fixed lenses.

The terms "convex lens system" and "concave lens system" refer to systems which include one or a plurality of lenses making up the respective lens units so as to provide a convex lens function and a concave lens function.

Although, in each of the embodiments, only spherical lenses are used as the lenses making up the collimator lens system, aspherical lenses or diffraction lenses may be used similarly depending upon, for example, the conditions of occurrence of various aberrations.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
   a laser light source configured to emit a laser beam;
   a collimator lens system including a plurality of lenses configured to collimate the light beam emitted from the laser light source and incident thereupon as diffused light; and
   an objective lens, the laser beam transmitted through the collimator lens system incident upon the objective lens,
   wherein the collimator lens system includes a first biconvex lens unit held so as to be movable in an optical axis direction of the laser beam and a fixed second biconvex lens unit.

2. The optical pickup according to claim 1, wherein, in the collimator lens system, the first lens unit is disposed further away from the laser light source.

3. The optical pickup according to claim 1, further comprising a driving mechanism configured to drive the first lens unit in the optical axis direction of the laser beam.

4. The optical pickup according to claim 1, wherein wave aberration is produced in accordance with the movement of the first lens unit.

5. An optical disc device performing a recording operation and/or a reproducing operation on an optical disc recording medium, the optical disc device comprising:
   an optical pickup including at least a laser light source configured to emit a laser beam, a collimator lens system including a plurality of lenses configured to collimate the light beam emitted from the laser light source and incident thereupon as diffused light, and an objective lens, the laser beam transmitted through the collimator lens system incident upon the objective lens,
   wherein the collimator lens system includes a first biconvex lens unit held so as to be movable in an optical axis direction of the laser beam and a fixed second biconvex lens unit.

6. The optical disc device according to claim 5, wherein, in the collimator lens system, the first lens unit is disposed further away from the laser light source.

7. The optical disc device according to claim 5, further comprising a driving mechanism configured to drive the first lens unit in the optical axis direction of the laser beam.

8. The optical disc device according to claim 5, wherein wave aberration is produced in accordance with the movement of the first lens unit.

* * * * *